No. 607,562. Patented July 19, 1898.
G. W. ALMSTEAD.
FIRE EXTINGUISHER.
(Application filed Jan. 14, 1898.)
(No Model.)
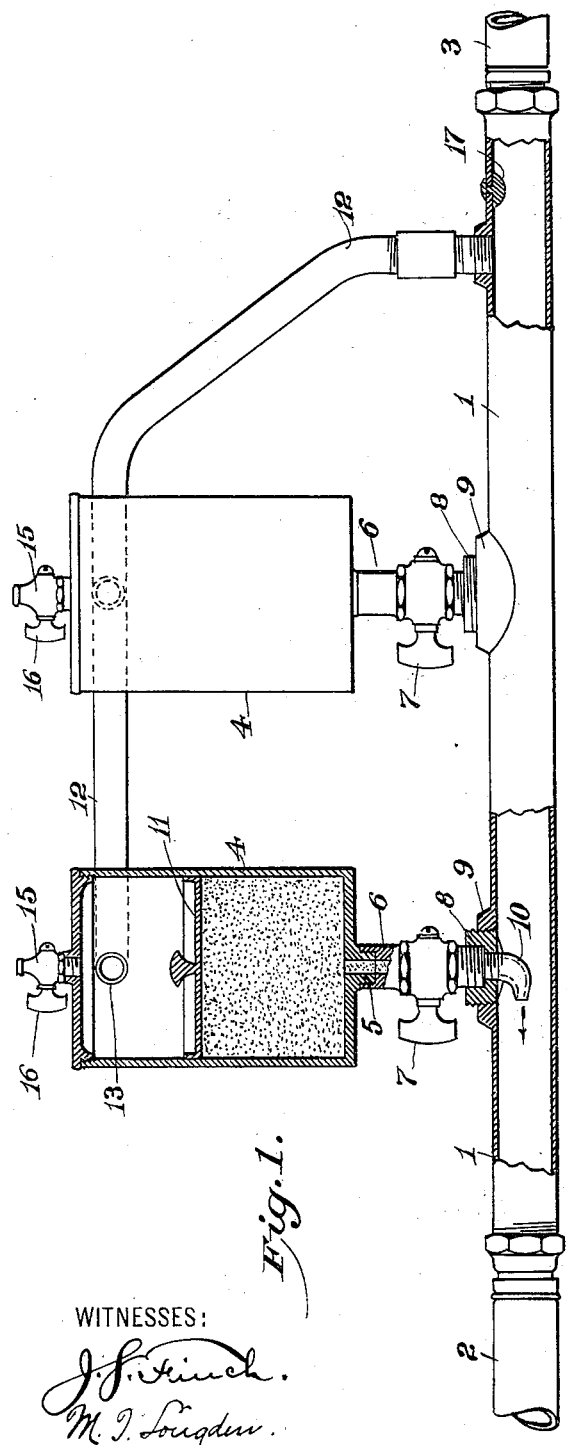
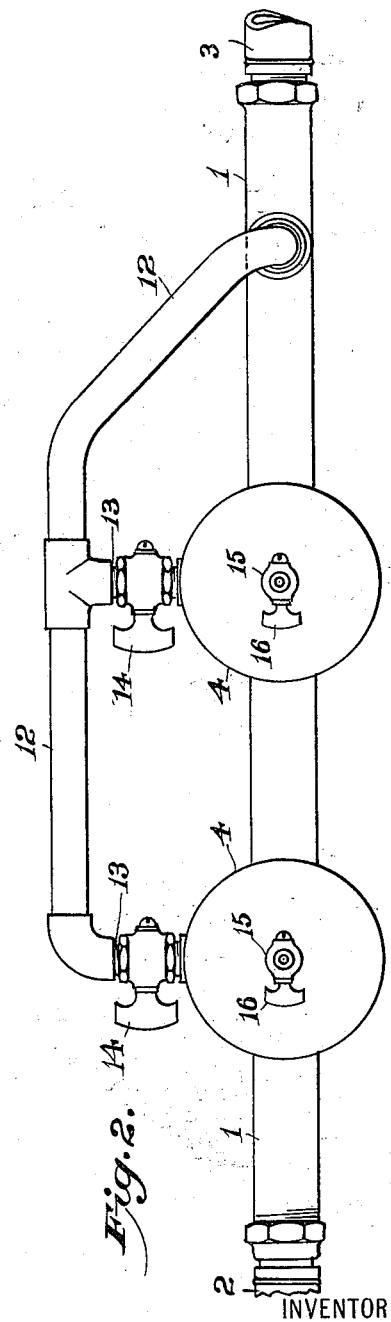
WITNESSES:
INVENTOR
G. W. Almstead
BY
ATTORNEY

UNITED STATES PATENT OFFICE.

GASTON W. ALMSTEAD, OF BRIDGEPORT, CONNECTICUT.

FIRE-EXTINGUISHER.

SPECIFICATION forming part of Letters Patent No. 607,562, dated July 19, 1898.

Application filed January 14, 1898. Serial No. 666,630. (No model.)

*To all whom it may concern:*

Be it known that I, GASTON W. ALMSTEAD, a citizen of the United States, residing at Bridgeport, in the county of Fairfield and State of Connecticut, have invented certain new and useful Improvements in Fire-Extinguishers; and I do hereby declare the following to be a full, clear, and exact description of the invention, such as will enable others skilled in the art to which it appertains to make and use the same.

My invention relates to certain new and useful improvements in fire-extinguishers; and it consists in the improved method of supplying fire-extinguishing material, substantially as set forth.

In the accompanying drawings, which form a part of this application, Figure 1 is an elevation, partly in section, showing a portion of a fire-hose equipped with my improvement; and Fig. 2 is a plan view of the same.

Similar numbers of reference denote like parts in both figures of the drawings.

I am aware that heretofore various constructions have been devised for attachment to a hose or any waterway connected therewith, the object being to impregnate the water with a chemical substance; but these constructions are more or less complicated and expensive, whereas my improvement is exceedingly simple and efficient and differs in structure from prior devices of this sort. A serious defect in prior devices of this description is due to the fact that a stream of water from the hose is led into the canister containing the chemical and washes through the latter out again through the hose, thus rapidly emptying the canister and impregnating a very limited amount of water. Moreover, this washing of a stream under pressure through the chemical will carry a goodly portion of the latter in solid condition out through the hose-nozzle.

The principal feature of my invention is the impregnating of the water in the hose without the passage of water through the canister, whereby the delivery of the chemical into the hose-pipe is not too abrupt or rapid, so that the proper impregnation of the water will extend throughout a considerable space of time. Again, I accomplish these results without choking or in any way interfering with the free passage of the water through the hose, and in this respect my invention is an improvement upon those constructions in which a portion of the main water-stream is diverted through the chemical canister and attended with a partial or complete cutting off in cross-section of the main waterway. Also, I do not wish my invention to be confounded with lubricators which inject oil into steam-conduits by means of specially-constructed cylinders and pistons, and in this respect attention is called to the fact that I employ a canister of uniform diameter and a plain diaphragm which closely fits within said canister and rests by gravity alone upon the chemical, which latter is led into the hose-section through a pipe which extends from the bottom of the canister into said section, so that by opening a cock in said pipe the water may back up from said section and reduce the chemical to the proper consistency before any pressure is applied upon the diaphragm to inject the chemical into the main water-stream. I wish it to be understood, however, that I do not claim, broadly, the adaptation of a chemical containing and controlling device to a water-hose or any part connected therewith, since I am aware that such arrangement is old and well known.

In carrying out my improvement I have a tube 1, which is approximately of the same diameter as the hose, and I couple this tube between any suitable adjoining sections 2 3 of the hose. 4 are canisters which contain the chemical in powdered form, the bottoms of these canisters having perforated hubs 5, to which are screwed short tubular pieces 6, which latter are provided with ordinary cocks 7. These tubes are secured within the tube 1 in any suitable manner, in the present instance nuts 8 being screwed within risers 9, brazed to the tube 1, while the tubes 6 are screwed within the upper portion of the nuts, a contracted nozzle 10 being screwed within the lower portion of the nut as a continuation of the tubes 6, said nozzle projecting within the tube 1 and being deflected so as to extend for a short distance parallel with the tube 1 and in the direction of the flow of the water therethrough.

In assembling the parts of my improvement I first attach the nozzles 10 within the nuts and then secure the nuts in position, and thereafter the tubes 6 are secured within the nuts in the manner above described.

Within the canisters is a diaphragm 11, (only one shown,) which rests by gravity alone immediately upon the powdered chemical and is capable of being readily moved up and down within the canisters.

12 is a pipe which is secured to the tube 1 in communication therewith and which rises and extends in proximity to the upper portions of the canisters, this pipe being connected with the canisters by means of short nipples 13, within which latter are ordinary cocks 14.

15 are air-vents in the tops of the canisters and provided with cocks 16.

The operation of my improvement is as follows: During the passage of the water through the hose when the service of my improvement is not desired the cocks are all closed. Whenever the advantages of a chemical extinguisher are desired, the cocks 7 are first opened, thereby permitting the water to back up within the canisters and soak the powdered substance therein, so as to reduce the same to the consistency of paste. The backing up of the water in this manner will cause the diaphragms 11 to be thrown upward, and this will of course effect the compression of the air within the upper portions of the canisters. The cocks 14 16 are now opened, whereby the air will escape through the vents 15 and the water under pressure will be forced into the canisters above the diaphragms 11, thereby causing the diaphragms to be forced downward, so as to discharge the chemical substance out through the nozzles 10 into the water in the tube 1.

It will be observed that the nozzles 10 are deflected and extend for a short distance in the same direction with the current which passes though the tube 1, and this is absolutely necessary to the proper operation of my improvement, since the current of water will thereby induce a current down through the nozzle 10 and will insure the constant discharge of the chemical into the water. The cocks 7 may of course be operated to control the supply of the chemical, while the cocks 16 are preferably closed as soon as the canisters are relieved from the air-pressure.

I prefer to provide the interior of the tube in proximity to the pipe 12 with a button 17 to act as a breakwater, and thereby insure the rising of the water within the tube 12; but this is not absolutely necessary, since the ordinary pressure of the water is sufficient for this purpose.

I have shown two canisters in position upon the tube 1, but of course it will be readily understood that a single canister or any number of the same can be employed without departing from the spirit of my invention, and in this connection I would state that when a plurality of canisters is used I would prefer to connect them with the tube 1 to supply the chemical at different times, so that the chemical may be renewed in one canister while the remaining canisters are supplying the chemicals.

I have heretofore stated that I use the chemical in powdered form in the canisters and reduce the same to a liquid paste by means of the water introduced upwardly within the canisters by opening the cocks 7. While under all circumstances I would prefer to carry out my invention in this manner, since the water in the tube 1 will thereby be more efficiently impregnated with the chemical, nevertheless it will of course be clear that the chemical may be utilized in liquid form instead of powdered form without in the slightest particular changing my construction or the operation of the parts thereof. I therefore do not wish to be limited to the use of any particular chemical or to the character of the latter, whether in liquid or powdered form.

The tops of the canisters are readily removable, and the diaphragms are lifted out by hand for the purpose of renewing the chemical. The deflection of the nozzles 10 on the ends of the vertical pipes, which lead the chemical directly into the hose, will create a suction which will draw the chemical into the water without any pressure above the diaphragm, so that this pressure is necessarily very light and gradual and may be obtained at times by the weight alone of the water above and upon the diaphragm after the cocks 14 have been closed.

Having thus described my invention, what I claim as new, and desire to secure by Letters Patent, is—

1. The method of supplying a solution to a stream of fluid passing through a conduit which consists in the following steps, viz: first, inclosing the soluble material in a suitable receptacle provided with vent-openings and with a dividing, movable septum, placing the material upon one side of said septum, second introducing fluid into said material from said conduit through a suitable branch conduit, third, closing the vent-openings, fourth, introducing fluid from said conduit into the space in said receptacle on the opposite side of said septum, suitable provision being made for a preponderance of pressure upon that side of the septum, all as and for the purposes described.

2. A main tube 1, provided with a deflecting-button 17, in combination with a canister for containing fire-extinguishing material, a movable, imperforate septum, an air-outlet from the upper part of the canister, a branch tube extending from the said tube 1 to the said canister above the said septum, and a tubular connection from the said pipe 1 to the said canister below the said septum, the said branch tube leading to the top of the canister joining the main tube a little beyond the said button in the line of flow of the water, but being wholly exterior to the bore of the said main pipe so as not to obstruct the same substantially as set forth.

In testimony whereof I affix my signature in presence of two witnesses.

GASTON W. ALMSTEAD.

Witnesses:
F. W. SMITH, Jr.,
M. I. LONGDEN.